March 17, 1970   H. KRAINER ET AL   3,501,288
METHOD OF PREREDUCING SINTERS AND PELLETS
Filed May 22, 1968

INVENTOR.

United States Patent Office 3,501,288
Patented Mar. 17, 1970

3,501,288
METHOD OF PREREDUCING SINTERS AND PELLETS
Helmut Krainer, deceased, late of Essen, Germany, by Erika Krainer, Selma Krainer, and Wolfram Krainer, heirs, Essen, Germany; and Gunter Meyer, Essen, and Harry Serbent, Mulheim (Ruhr), Germany; said Meyer and said Serbent assignors to Fried. Krupp Gesellschaft mit beschrankter Haftung, Essen, Germany, a corporation of Germany
Continuation-in-part of application Ser. No. 451,265, Apr. 27, 1965. This application May 22, 1968, Ser. No. 763,032
Claims priority, application Germany, Apr. 30, 1964, B 76,601
Int. Cl. C21b 1/18
U.S. Cl. 75—5                           11 Claims

ABSTRACT OF THE DISCLOSURE

A method of producing ore-sinters and pellets to be reduced in a furnace, which comprises the steps of sintering fine ores containing oxygen bound to iron and pellets formed therefrom, respectively, at sintering temperature by feeding the same in form of a hot moving layer on a travelling grate to a strength sufficient for their reduction in the furnace. The pellets are subjected thereafter without prior cooling to a pre-reduction by feeding reducing gases crosswise through the hot moving layer of sinters and pellets respectively; starting the step of pre-reduction at a temperature range of about between 1000° C. to 1300° C. and terminating the step of pre-reduction at about 700° C., reducing the oxygen bound to the iron between about 30% to 80% in the pre-reduction step, and performing the final reduction in the furnace.

---

Figure 1:
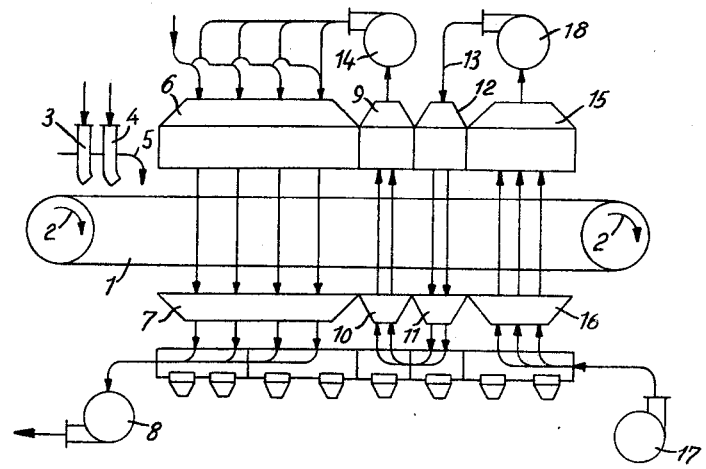

The present invention is a continuation-in-part application of our copending patent application, Ser. No. 451,265, filed on Apr. 27, 1965, now abandoned.

The present invention relates to a method of pre-reducing sinters and pellets.

In the production of pig iron in a blast furnace, an increase of the output per furnace unit can be obtained such that instead of normal charges, charges in a pre-reduced state are used, for instance, upon transferring its iron content into the Wustite stage.

Also during the production of pig iron by electrical means, the advantages of the charge of a pre-reduced product have been recognized already for some time with respect to the consumption of electric current and in many instances, only by such arrangement an economical production of pig iron in the electro reduction furnaces is made possible.

The blast furnace mills are for this reason desired to increase the sinter portion in the mixture of ores and fluxes. More recently, also pellets have gained more importance, due to their favorable physical characteristics as raw material for the production of pig iron. The production of both agglomerates includes a thermal process step.

During the sintering of the fine ores, for instance, on a Dwight-Lloyd-sinter band, the latter are placed on a travelling grate after having been moistened and mixed with coke breeze and the mixture is ignited. By continuous suction of air through the mixture, a hot zone having a maximum of about 1,500° C. moves with a speed of a few centimeters per minute through the layer of material having a height of about 200–300 mm. Upon termination of the sintering process, the sinter can be then cooled by subjecting the same to air suction.

So-called green pellets produced of ore concentrates or ground fine ores show an insufficient strength for the direct charge into the blast furnace. They can be hardened on a moving grate by direct heating, whereby temperatures having a maximum of about 1,300° C. are required.

It is one object of the present invention to provide a method of pre-reducing of ore sinters and ore pellets, in which the heat of the end products resulting from the sintering of the ores and hardening of the pellets are exploited for a pre-reduction such that upon termination of the sintering and of the burning process, respectively, reducing gases are fed, either by suction or by blowing, through the charge disposed on the moving grate.

In the first place, the waste gases of the furnaces are used for this pre-reduction, in which furnaces the further treatment of the sinters or of the pellets takes place, for instance, blast furnace gas, waste gases of low shaft furnaces or waste gases of electro-reducing furnaces. These gases can be used also in non-purified form, since the sinter and pellet layer, respectively, to be reduced, operates as a dust filter. It is, however, also possible to apply other gases for the reduction, for instance, coke-furnace-, oil-, or natural gases. The feeding of the gases can be performed in known manner by means of hoods.

Blast furnace gases are thereby normally capable, due to their composition, of reducing iron oxides to the Wustite-stage (that is, a reduction of the oxygen bound to the iron to about 30% to 80%), while the other mentioned gases make possible a reduction of the iron oxides to the metallic iron. A complete reduction is, however, not desired. thereby.

While during the pellet burning process practically the entire layer of material is at an equally high temperature, sufficient for the reduction, during the sintering process, as a rule, only the material directly above the grate has a corresponding temperature. It is for this reason advisable to heat up the entire layer by means of an oil-, gas-, or coal-dust burner upon termination of the sintering process and prior to feeding therethrough the reducing gases. As corresponding tests have disclosed, this renewed heating is possible within a few minutes, if a heating is applied which corresponds as to its strength about to the ignition required for the start of the sintering process.

The following reduction of the charge containing oxygen bound to iron about the Wustite-stage, that means, a pre-reduction of the oxygen which is bound to the iron to about 30% to 80%, for instance, by means of blast furnace gases with

|  | Vol. percent |
|---|---|
| CO | 28 |
| $CO_2$ | 13 |
| $H_2$ | 5 | and requires a time period of about 15–20 minutes, whereby the main quantity of the oxygen is removed already after 5 to 8 minutes. The pre-reduction starts with a starting temperature between about 1000° C. to 1300° C. and terminates at 700° C. The temperature of the material falls, e.g., thereby, for about 200° C., for instance, from 1,000° C. (if the latter is the starting temperature) to 800° C. The reduction comes to a standstill, however, only then, when a temperature of the material of less than about 700° C. is reached. Thus, a comparatively large temperature range is available for the reduction. The still remaining heat of the pre-reduced charge can be exploited for the preheating of the reduction gases such, that the latter are fed once or several times prior to the removal of the charge from the travelling grate through the material.

The pre-heating of the gases can be performed also such, that it is partly burned with controlled air feeding.

Figure 2:
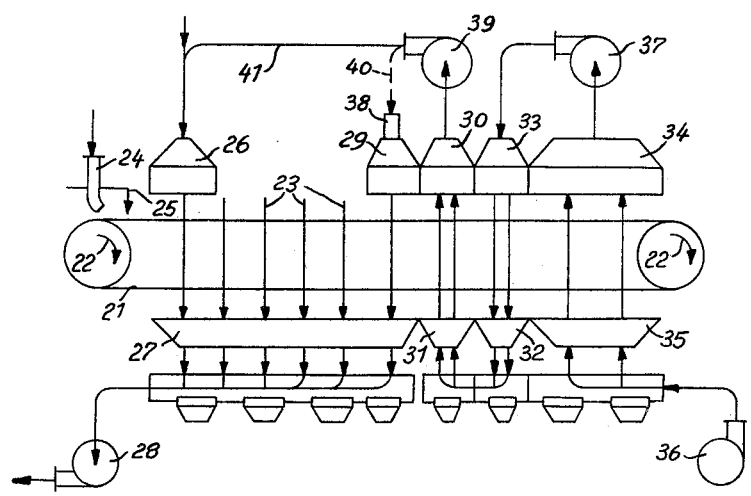

With this and other objects in view, which will become apparent in the following detailed description, the present invention will be clearly understood in connection with the accompanying drawing, in which:

FIGURE 1 discloses a schematic showing of a moving grate for the hardening of iron pellets with pre-heating of the reduction gases; and FIG. 2 is a schematic showing of a sinter band designed for the same purpose, in which the after-heating of the ore sinter is provided.

Referring now to the drawing, and in particular to FIG. 1, the apparatus designed for performing the method of the present invention comprises a travelling grate 1. The direction of movement is indicated by the arrows 2. Charging tubes 3 and 4 are provided which serve the purpose of feeding an already pre-reduced charge, which protect the grate 1 and the sides of the pellet charge during burning. The feeding of green pellets is indicated by the arrow 5 schematically. A hood 6 is arranged about the grate 1 and the charge is heated by means of burners below the hood 6. The burner gases are received by a hood 7 and are fed to the waste gas blower 8. Upon leaving the burning zone, the charge enters the range of the hoods 9, 10, 11, 12, that means, the zone of pre-reduction. The reduction gases are fed into the hood 12, as schematically indicated by the arrow 13, and are caught upon passing a pellet layer in the hood 11, then fed to the hood 10, whereupon they move once more through the layer of pellets and then fed by means of the blower 14 to the burning zone within the range of the hood 6, where they are burned and exploited for the burning of the pellets. The charge moves from the pre-reduction zone into the cooling zone, which is limited by the hoods 15 and 16. The reduction gases used for the cooling, for instance, blast furnace gases, are fed to the hood 16 by means of a blower 17 and upon passing through and cooling of the charge, are brought in a pre-heated state by means of the blower 18 into the pre-reduction zone, where they flow, as already indicated above, through the charge which is pre-reduced by the gases.

The starting point of the pre-reduction in the process of the present invention is between about 1000° C. to 1300° C. and the end point is about 700° C. The pre-reduction of the oxygen bound to iron is between about 30% to 80%.

Referring now again to the drawing, and in particular to FIG. 2, a travelling grate 21 is disclosed, the direction of movement of which is indicated by the arrows 22. The charge of already pre-reduced ore for the protection of the travelling grate 21 takes place through the tube 24 and the charge of the ore to be sintered and to be pre-reduced, which ore is admixed with a fuel, is obtained in the direction of the arrow 25. The ore-fuel-mixture is ignited by a flame within the range of the hood 26. The sintering takes place by means of blowing or suction of air in the direction of the arrows 23 through the mixture. The waste gases of the sintering zone are caught in the hood 27 and fed off by means of a waste gas blower 28. A heating of the sintering charge takes place within the range of the hood 29, which is equipped with a remote heating burner 38, in order to subject the sintering charge to the temperature required for the pre-reduction. The zone of the pre-reduction is limited by means of the hoods 30, 31, 32 and 33 and the cooling takes place within the range of the hoods 34 and 35. The reduction gases fed by the blower 36, are used in this arrangement in the cooling zones as a cooling gas and, thereby, pre-heated. They move then by means of the blower 37 to the reduction zone, in which they flow twice through the charge and then enter blower 39 from which they leave via conduit 41 and conduit 40. The gases passing through the conduit 41 are then still used at least partly for the ignition of the ore-fuel mixture below the hood 26 and the gases passing through conduit 40 are then partly burned in burner 38 with controlled air in hood 29. The blower 39 serves to suck the reduction gas from the hood 30 and at least partly conducts the reduction gas for the ignition of the sinter mixture in the hood 26; further the gases are possibly branched through the conduit 40 to the hood 29.

With the present invention the ore or pellets are sintered by heating to rigid bodies or to pellets, such that they have sufficient rigidity for the smelting in the furnace. In connection with the sintering process, a part reduction takes place by passing of reduction gases through the ore and pellets, respectively, whereby the heat contained in the ore or in the pellets is exploited for the part reduction.

The quantity of the added carbon must suffice merely for the sintering process. For the pre-reduction step, a reduction gas is used. This has the advantage that the reduction gas prior to the feeding into the reduction zone can be used as a cooling gas for the pre-reduced material, whereby it is heated and thus provides a good heat exploitation.

Final reduction does not take place on the travelling grate but in the furnace. Pre-reduced sinters or pre-reduced pellets for the furnace are produced.

The sinters or pellets are of such strength that they can be reduced in the furnace where they have to withstand the high pressure of the feed. The burning of the pellets provides sufficient strength in the furnace and at temperatures above 1000° F.

While we have disclosed several embodiments of the present invention, it is to be understood that these embodiments are given by example only and not in a limiting sense, the scope of the present invention being determined by the objects and the claims.

We claim:

1. A method of producing ore-sinters and pellets to be reduced in a furnace, comprising the steps of
    sintering fine ores containing oxygen bound to iron and pellets formed therefrom, respectively, at sintering temperature by feeding the same in form of a hot moving layer on a travelling grate to a strength sufficient for their reduction in the furnace,
    subjecting said layer of sinters and pellets thereafter without prior cooling to a pre-reduction by feeding reducing gases crosswise through said hot moving layer of sinters and pellets, respectively,
    starting said step of pre-reduction at a temperature range of about between 1000° C. to 1300° C. and terminating said step of pre-reduction at about 700° C.,
    reducing said oxygen bound to said iron between about 30% to 80% in said pre-reduction step, and
    performing the final reduction in the furnace.

2. The method, as set forth in claim 1, wherein said first mentioned feeding step is performed by suction.

3. The method, as set forth in claim 1, wherein said first mentioned feeding step is performed by blowing.

4. The method, as set forth in claim 1, wherein said first mentioned feeding step through said hot moving layer is performed several times.

5. The method, as set forth in claim 1, wherein said reducing gases are waste gases selected from a group consisting of blast furnace gases, waste gases of a low shaft furnace and waste gases of an electro-reduction-furnace, and
    further comprising the step of further working said partly reduced charge in a furnace from which said waste gases are obtained.

6. The method, as set forth in claim 5, wherein said waste gases are fed through said hot moving layer in their non-purified state.

7. The method, as set forth in claim 1, wherein said reducing gases are selected from the group consisting of coke-furnace gases, oil gases and natural gases, and
    said reducing gases are used only in such quantity and concentration that only a part reduction of the iron oxides is brought about.

8. The method, as set forth in claim 1, which includes the step of feeding said reducing gases at least once through said still hot and reduced layer prior to said reduction step, in order to pre-heat said reducing gases.

9. The method, as set forth in claim 1, which includes the step of burning partly said reducing gases with controlled addition of air, in order to pre-heat said reducing gases.

10. The method, as set forth in claim 1, which includes the step of pre-heating said layer to be reduced prior to feeding said reducing gases through said layer.

11. The method, as set forth in claim 1, which includes the step of applying the chemical heat of the waste gases of said pre-reduction step for the ignition during the sintering process.

References Cited

UNITED STATES PATENTS

| | | | |
|---|---|---|---|
| 2,826,487 | 3/1958 | Davis | 75—5 |
| 2,864,686 | 12/1958 | Agarwal | 75—3 |
| 3,088,723 | 5/1963 | Haley et al. | 75—5 X |
| 3,172,754 | 3/1965 | Anthes et al. | 75—5 |
| 3,203,782 | 8/1965 | Meyer et al. | 75—5 |
| 3,244,507 | 4/1966 | Linney | 75—3 |

HYLAND BIZOT, Primary Examiner

E. L. WEISE, Assistant Examiner